US00RE45889E

(19) United States
(12) Reissued Patent
Long et al.

(10) Patent Number: US RE45,889 E
(45) Date of Reissued Patent: Feb. 16, 2016

(54) MULTIPLE SAFETY ELEMENT TORQUE LIMITER

(71) Applicants: Randall Long, Wichita Falls, TX (US); Joseph C. Blum, Schwenksville, PA (US); Thomas F. Long, Jr., Wichita Falls, TX (US); Mark Wayne Rudolph, Wichita Falls, TX (US)

(72) Inventors: Randall Long, Wichita Falls, TX (US); Joseph C. Blum, Schwenksville, PA (US); Thomas F. Long, Jr., Wichita Falls, TX (US); Mark Wayne Rudolph, Wichita Falls, TX (US)

(21) Appl. No.: 14/260,346

(22) Filed: Apr. 24, 2014

Related U.S. Patent Documents

Reissue of:
(64) Patent No.: 8,162,246
Issued: Apr. 24, 2012
Appl. No.: 12/717,112
Filed: Mar. 3, 2010

(51) Int. Cl.
*B02C 17/24* (2006.01)
*B02C 2/04* (2006.01)
*F16D 7/10* (2006.01)

(52) U.S. Cl.
CPC ..... *B02C 2/047* (2013.01); *B02C 17/24* (2013.01); *F16D 7/10* (2013.01)

(58) Field of Classification Search
CPC ..... B02C 17/24; E21C 31/00; E21C 31/12
USPC ..... 173/176; 192/54.2, 56.5; 241/101.2, 241/299; 299/29
See application file for complete search history.

(56) References Cited

U.S. PATENT DOCUMENTS

| | | | | |
|---|---|---|---|---|
| 3,834,631 | A * | 9/1974 | King | 241/26 |
| 3,866,728 | A * | 2/1975 | Orwin | 192/56.5 |
| 3,952,811 | A * | 4/1976 | Carre | 172/45 |
| 4,176,733 | A * | 12/1979 | Twickler | 192/223.2 |
| 5,000,462 | A * | 3/1991 | Trozzi | 241/179 |
| 6,474,579 | B1 | 11/2002 | Bardos et al. | 241/186.35 |
| 6,836,089 | B2 * | 12/2004 | Siebert | 241/36 |
| 7,104,482 | B2 * | 9/2006 | Juhlin | 241/101.2 |
| 2010/0210386 | A1 * | 8/2010 | Long, Jr. | 192/54.52 |

* cited by examiner

*Primary Examiner* — William Doerrler
(74) *Attorney, Agent, or Firm* — John R. Benefiel

(57) ABSTRACT

A displaceable drive ball safety element type torque limiter is installed in a variable speed AC motor drive crusher mill drive which can include a selective operable locking brake to hold the crusher components stationary during maintenance operations.

2 Claims, 4 Drawing Sheets

MULTIPLE SAFETY ELEMENT TORQUE LIMITER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims the benefit of U.S. provisional application No. 61/209,086 filed on Mar. 3, 2009.

BACKGROUND OF THE INVENTION

The present invention concerns variable speed AC driven mining machinery such as crusher mills. Such mills involve massive components and very large horsepower motors in excess of 1000 hp. This type of AC motor sometimes malfunctions in such a way as to create a very large momentary spike in torque sufficient to destroy the pinion ring drives for the mills. This is a catastrophic failure and most require months to bring the equipment back on line.

The industry has previously exclusively used "SAFESET" (trademark of Voith Company of Germany) torque limiters, which are costly and require a long lead time to obtain. They also require part replacements when an overload occurs and involve friction such as to be subject to wear. Ordinary friction torque limiters have been thought to be inadequate for such an application, and shear pins are not consistent in releasing drive and must he replaced.

SUMMARY OF THE INVENTION

The present invention utilizes torque limiters of a type sold by Brunel Corporation and described in copending U.S. application Ser. No. 12/704,581 filed on Feb. 12, 2010, incorporated by reference herein. The safety elements are mounted radially (or axially) on a pitch circle diameter. These torque limiter safety elements include balls held down in detents (drill point type holes) by spring forces acting on locking balls. Shearing (torque) forces are applied to the complement of balls in their detent pockets. This produces driving torque, which is transmitted from input to output through the drive balls. When the driving torque exceeds the allowable torque set by spring forces holding locking balls which hold the plungers keeping the drive balls in the detent pockets, the locking balls are displaced and the drive balls ride out of the detent pockets. The locking balls ride up ramps to an outside diameter which produces a complete disconnect of the torque limiter allowing relative rotation to continue indefinitely without any frictional drag.

Reengagement is accomplished by rotating the now free drive limiter half to align match marks on the driven hub. Plungers which reset the spring loaded balls into their pockets are tapped with a. dead bow hammer reseating the locking balls to reapply the spring load and reset the torque limiter to the preset release torque setting.

An important additional feature is the provision of a large brake disc and brake caliper integrated in the torque limiter.

When the torque limiter is disengaged, the brake caliper is activated to hold the mill drive stationary and prevent the mill from moving, which would present a safety hazard to a maintenance worker entering into these very large machines to do repairs. Movement of the components may otherwise occur.

The torque limiter design:

1. Can include a brake disc for use in a holding brake system used on the ball and sag mill application.
2. Is less expensive than other types of styles of products.
3. Takes less time to reset after an overload event that disengages the ball detent safety elements.
4. Has a resetting reliability which doesn't rely on highly skilled maintenance personnel.
5. No spare or replacement parts are required after one or multiple overload events that disengage the ball detent safety elements.
6. Can be used in low and high speed applications.
7. Can accommodate a variety of mounting configuration based on shaft arrangements.

DETAILED DESCRIPTION

In the following detailed description, certain specific terminology will he employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
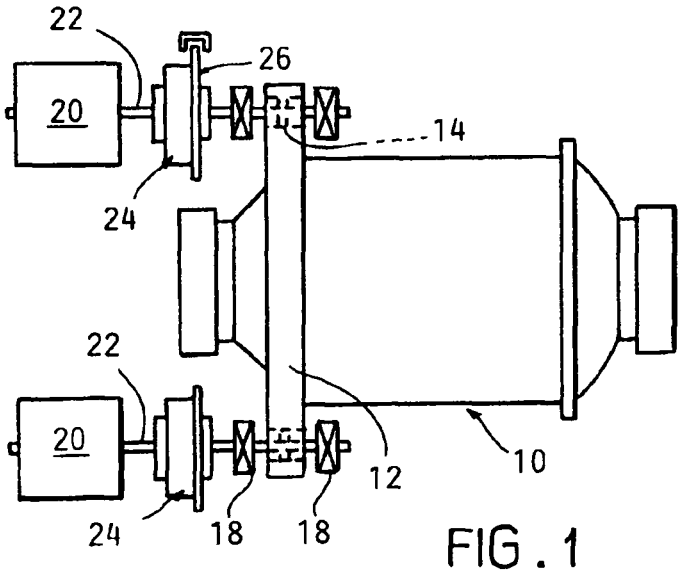
FIG. 1 is a diagram of an apparatus according to the invention including a ball or sag crusher mill in combination with a low speed drive incorporating a torque limiter of a type depicted below in the other Figures.

FIG. 1 depicts a low speed crusher mill 10 having a ring gear 12 affixed to its perimeter at one end driven by two pinions 14 on a shaft 16 supporting a pillow block hearings 18. A pair of variable speed AC motors 20 each have an output shaft 22 which each in turn drive an input of a torque limier 24 of a type described herein and in the copending patent application referenced above. A flex coupling 22 can be included for easier alignment.

A disc locking brake 26 can be included as a safety feature.

Figure 2:
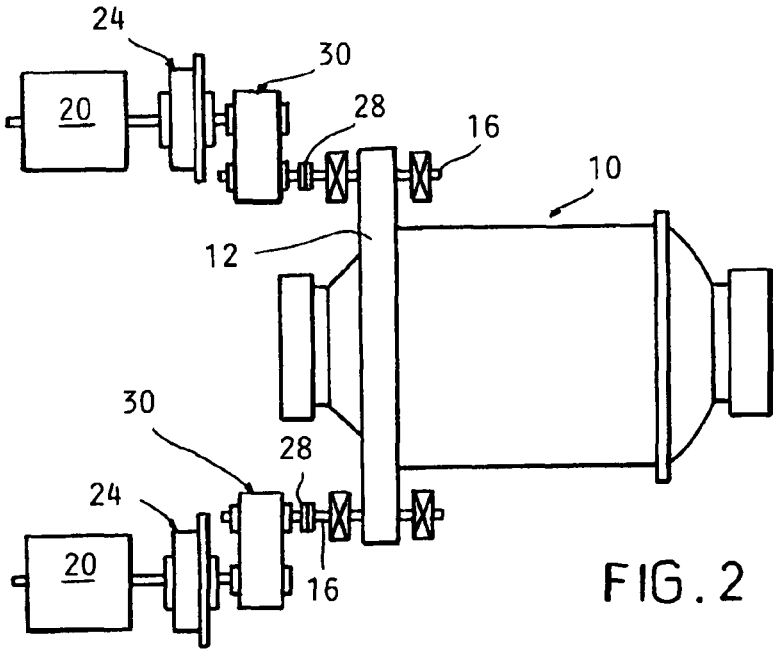
FIG. 2 is a diagram of another apparatus according to the invention including a ball or sag mill in combination with a high speed drive incorporating a torque limiter as in FIG. 4.

FIG. 2 depicts a high speed drive for a crusher mill 10 which includes reduction gearing 28 interposed between the torque limiter 24 and the pinion drive shaft 16.

Figure 3:
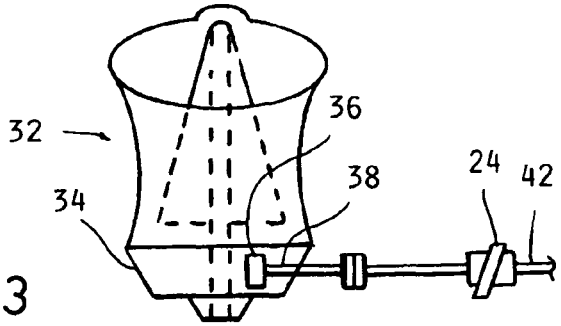
FIG. 3 is a diagram of another apparatus according to the invention including a gyratory cushion mill and drive incorporating a torque limiter as in FIGS. 1 and 2.

FIG. 3 depicts a gyratory crusher mill 32 with a drive gear 34 driven by a pinion 36 on a shaft 38.

A flex coupling 40 and spacer shaft connect the torque limiter 24 connected to a motor shaft 42.

Figure 4:
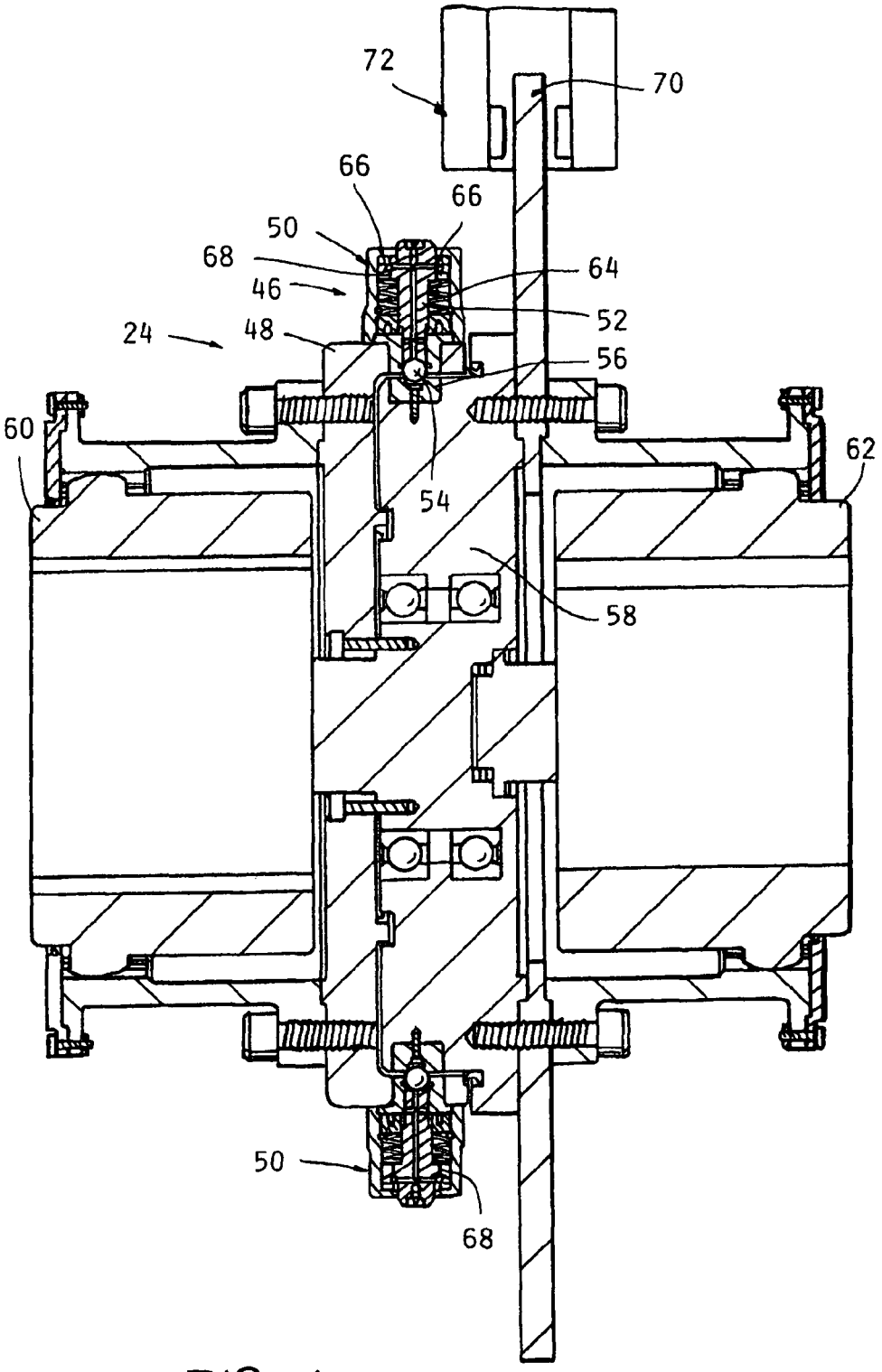
FIG. 4 is a partially sectional view of a torque limiter of a type utilized with the invention.
Figure 4A:
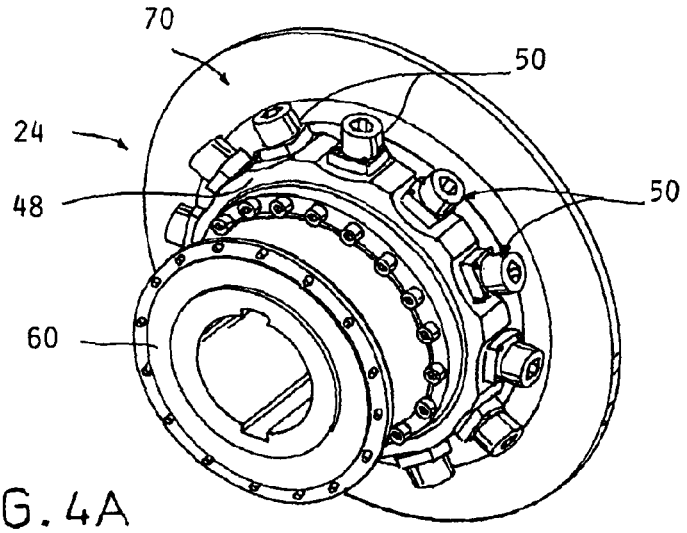
FIG. 4A is a pictorial view of the torque limiter shown in FIG. 4.
Figure 4B:
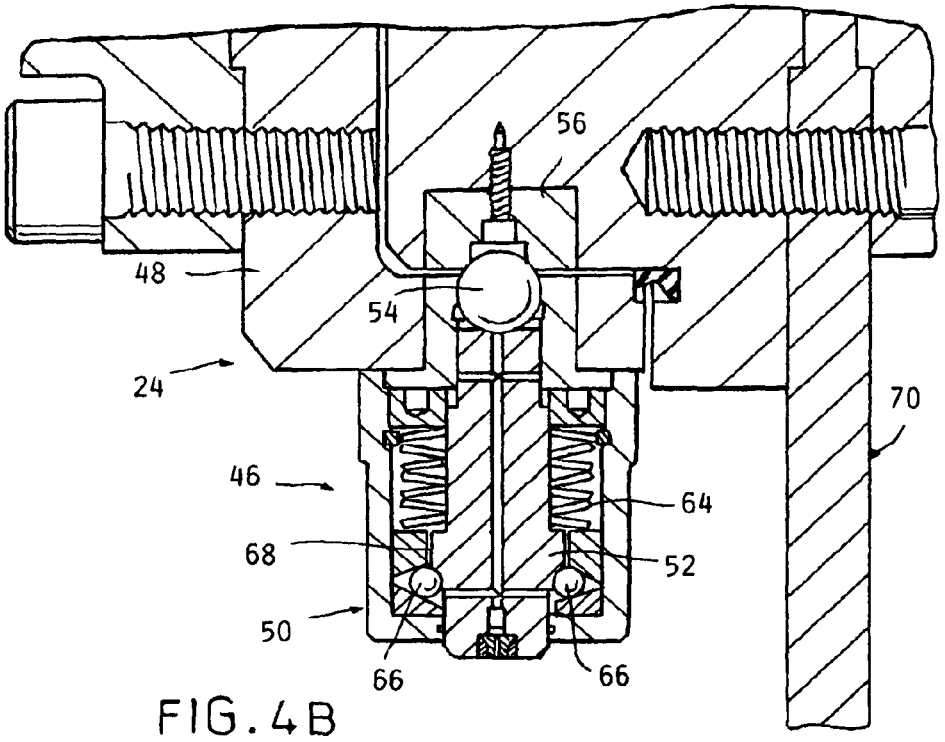
FIG. 4B is an enlarged view of a portion of FIG. 4.

FIG. 4 is an enlarged sectional view of a torque limiter 24 of the type combined with the crusher mill drive, and FIG. 4A is a pictorial view thereof.

Figure 5:
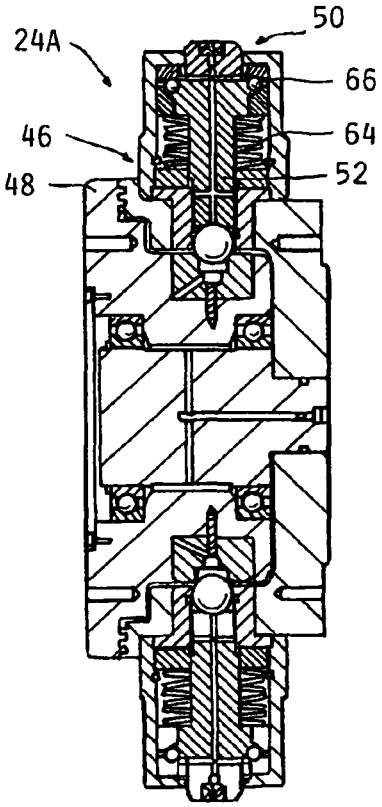
FIG. 5 is a partially sectional view of a torque limiter of a smaller capacity and without a locking brake.
Figure 5A:
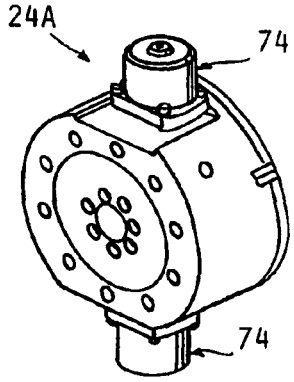
FIG. 5A is a pictorial view of the torque limiter shown in FIG. 5.
Figure 5B:
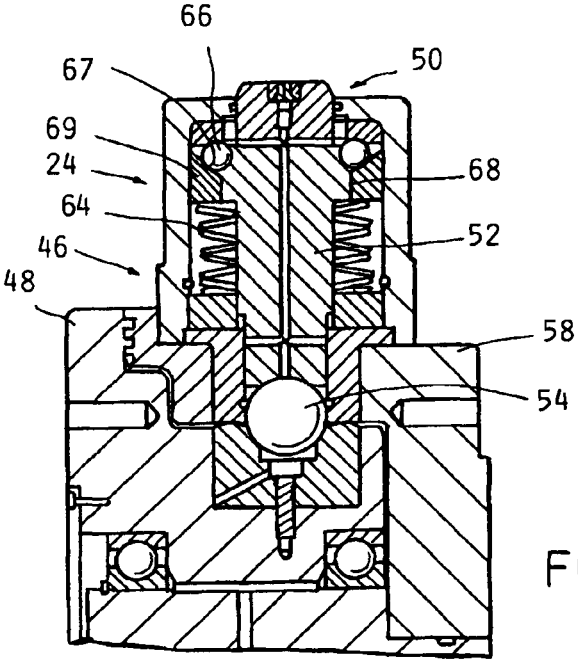
FIG. 5B is an enlarged view of a portion of FIG. 5.

FIGS. 5 and 5A show a lower capacity torque limiter 24A with only two safety elements 74.

Axially extending safety elements can also be used as described in the copending patent application referenced above.

The torque limiter 24, 24A are of a type previously commercialized but not heretofore combined with crusher mills, and includes a series of "safety elements" 46 which are each comprised of an outer module carrier 48 carrying a plurality of radially oriented module assemblies 50. The module assemblies 50 each include a plunger 52 engaging a drive ball 54 resting in a seat 56 carried in a detent pocket carrier 58. The carriers 48 and 58 are respectively attached to respective drive and driven members 60, 62 in the mill drive so as to establish a rotary drive from the motors 20 to the crusher mill 10 through the drive balls 54.

At a preset torque level, which can be as high as 700,000 lb-ft, the reaction of each drive ball 54 overcomes the force exerted by a series of Belleville springs 64 acting on a ramp ring 69 restraining radial movement of locking balls 66 allowing all of the plungers 52 to move radially out. Locking balls 66 are displaced to ride out over ramps 67 and onto an outer race 68. In this position, the locking balls 66 do not constrain the drive balls 54 to stay in the pockets 56. This action is described in detail in the above referenced copending application and is known in the torque limiter art.

A brake disc rotor 90 (FIG. 4) is affixed to detent pocket carrier 58 filed to the driven member 62, engaged by a caliper 72 when the torque limiter is disengaged, which can apply an engagement force to lock the rotor 70 and thus the driven member 62 and thereby prevent any motion of the mill components when the torque limiter is disengaged.

The invention claimed is:

1. A torque limiter arrangement in combination with a crusher mill driven by a ring gear and one or more pinion gears each driven by a variable speed AC motor having a driving connection with said crusher mill, said torque limiter including a plurality of plungers held against respective drive balls seated in aligned pockets in respective drive and driven members rotatable with said drive motor and said crusher mill respectively to establish a driving relationship thererbetween, each of said plungers held in engagement by a spring loaded locking ball able to be cammed out of engagement with a respective plunger upon development of a predetermined torque transmitted through said drive balls by said drive and driven members to force said locking balls radially out to a stably maintained disengaged position and allow said drive balls to each be moved out of a respective pocket and thereby discontinue said driving relationship between said variable speed AC motor with said crusher mill;

said torque limiter further including a selectively operable locking brake connected to said driven member and engaged when said torque limiter is disengaged thereby holding said driven member and crusher mill stationary when said torque limiter is disengaged.

*2. A torque limiter arrangement in combination with mining machinery driven by a ring gear and one or more pinion gears each driven by a variable speed AC motor having a driving connection with said mining machinery, said torque limiter including a plurality of plungers held against respective drive balls seated in aligned pockets in respective drive and driven members rotatable with said drive motor and said mining machinery respectively to establish a driving relationship therebetween, each of said plungers held in engagement by a spring loaded locking ball able to be cammed out of engagement with a respective plunger upon development of a predetermined torque transmitted through said drive balls by said drive and driven members to force said locking balls radially out to a stably maintained disengaged position and allow said drive balls to each be moved out of a respective pocket and thereby discontinue said driving relationship between said variable speed AC motor with said mining machinery;*

*said torque limiter further including a selectively operable locking brake connected to said driven member and engaged when said torque limiter is disengaged thereby holding said driven member and mining machinery stationary when said torque limiter is disengaged.*

* * * * *